United States Patent
Devara et al.

(10) Patent No.: US 9,336,747 B2
(45) Date of Patent: May 10, 2016

(54) DISPLAY DIMMING TO SAVE MOBILE DEVICE POWER DURING WEBPAGE, WEB CONTENT, AND DEVICE APPLICATION LOADING

(75) Inventors: Kavitha Vallari Devara, La Jolla, CA (US); Shyama Prasad Mondal, San Diego, CA (US); Ashfaque Mansur, San Diego, CA (US); Vivek Sekhar, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 470 days.

(21) Appl. No.: 13/614,856

(22) Filed: Sep. 13, 2012

(65) Prior Publication Data
US 2013/0141453 A1 Jun. 6, 2013

Related U.S. Application Data
(60) Provisional application No. 61/566,951, filed on Dec. 5, 2011.

(51) Int. Cl.
*G09G 5/10* (2006.01)
*G06F 3/14* (2006.01)

(52) U.S. Cl.
CPC .. *G09G 5/10* (2013.01); *G06F 3/14* (2013.01); *G09G 2330/021* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 4,516,055 A | 5/1985 | Nelson | |
| 2005/0251760 A1* | 11/2005 | Sato | G06F 3/023 715/856 |
| 2006/0097991 A1* | 5/2006 | Hotelling et al. | 345/173 |
| 2006/0119564 A1* | 6/2006 | Fry | G09G 3/3406 345/102 |
| 2007/0097065 A1* | 5/2007 | Kreek | G06F 1/1626 345/102 |
| 2010/0001967 A1* | 1/2010 | Yoo | 345/173 |
| 2012/0013552 A1* | 1/2012 | Ahn | G06F 3/04847 345/173 |
| 2012/0026202 A1* | 2/2012 | Maciesowicz | G06F 3/14 345/690 |
| 2012/0098870 A1 | 4/2012 | Barnhoefer et al. | |
| 2012/0287065 A1* | 11/2012 | Oshinome | 345/173 |
| 2014/0018132 A1* | 1/2014 | Hong | H04W 52/027 455/566 |
| 2014/0139560 A1* | 5/2014 | Jung | G09G 5/10 345/690 |

* cited by examiner

*Primary Examiner* — James A Thompson
(74) *Attorney, Agent, or Firm* — Neugeboren O'Dowd PC (57) ABSTRACT

Systems, methods, and apparatus are herein disclosed for controlling a display brightness based on user action or user interest in the display. In particular, the display brightness can be dimmed upon identification of a first marker indicative of a user action such as a request for a webpage. The brightness of the display can be increased or returned to its original state upon identification of a second marker indicative of completion of a user equipment activity triggered by the user action. In some embodiments, another brightness state between these two can be used as an intermediary and is triggered when a third marker, indicative of a progression of the user equipment activity, is identified.

19 Claims, 6 Drawing Sheets

DISPLAY DIMMING TO SAVE MOBILE DEVICE POWER DURING WEBPAGE, WEB CONTENT, AND DEVICE APPLICATION LOADING

CLAIM OF PRIORITY UNDER 35 U.S.C. §119

The present Application for Patent is a non-provisional of, and claims priority to, Provisional Application No. 61/566,951 entitled "DISPLAY DIMMING TO SAVE MOBILE DEVICE POWER DURING WEBPAGE, WEB CONTENT, AND DEVICE APPLICATION LOADING" filed Dec. 5, 2011, and assigned to the assignee hereof and hereby expressly incorporated by reference herein.

BACKGROUND

1. Field

The present disclosed embodiments relate generally to wireless mobile computing devices, and more specifically to power savings in the same relative to dimming the device display when a webpage, web content, or mobile device application is loading, based on an application state and user activity.

2. Background

Mobile communication devices including devices such as smartphones, tablet computers, gaming devices, and laptop computers are now ubiquitous. A common and ongoing issue with these types of devices is power management. More specifically, these types of devices continue to develop more advanced processing resources, displays, and communication systems that demand more and more power.

Although advances continue to be made in the areas of battery technology and hardware efficiency, these advances do not directly address the users' experience when a mobile device is operating under power constraints. As a consequence, the current mobile device power management techniques are not adequate to meet user expectations and will almost certainly not be satisfactory in the future.

One aspect of power management involves control of the display brightness, since displays are the most power-hungry aspects of many mobile devices today. For instance, 35% of battery power is often consumed by display components during web browsing. Many devices allow the user to manually control the screen brightness and others include algorithms that automatically adjust brightness based on signals from ambient light sensors and the amount of remaining battery charge. But these traditional display brightness control algorithms are typically tailored to characteristics of the mobile device and do not account for the user's interaction with the device, or the state of a running application on the device.

There is therefore a need in the art for systems and methods that use evidence of a user's interaction with the mobile device to control the display brightness and thereby conserve power.

SUMMARY

Embodiments disclosed herein address the above stated needs by controlling a brightness of a user equipment display based on user inputs or actions as well as the progression and/or completion of user equipment activities triggered by the user inputs or actions.

Other aspects of the disclosure can be characterized as a method of operating a user equipment including monitoring and setting operations. The method can include operating the display brightness of the user equipment at high, or enabling traditional display brightness control algorithms to control the display brightness. The method can include monitoring for a first marker indicating a start of an action by the user equipment. The method can further include setting a display brightness of the user equipment to low when the first marker is identified. The method may yet further include monitoring for a second marker indicating a completion of the action. Finally, the method can include setting the display brightness of the user equipment to high, or enabling traditional display brightness control algorithms to control the display brightness, when the second marker is identified.

Some aspects of the disclosure can be characterized as a non-transitory, tangible computer readable storage medium, encoded with processor readable instructions to perform a method for controlling a brightness of a display of a user equipment. The method can include rendering content to a display of a user equipment using a first brightness of the display. The method can then monitor user inputs and identify a first marker indicative of a user action directed to the user equipment. The method can then render the content to the display of the user equipment using a second brightness of the display that is dimmer than the first brightness of the display.

Further aspects of the disclosure can be characterized as a user equipment. The user equipment can include means for rendering content to a display of a user equipment using a first brightness of the display. The user equipment can further include means for monitoring user inputs. The user equipment can further include means for identifying a first marker indicative of a user action directed to the user equipment. Finally, the user equipment can include means for rendering the content to the display of the user equipment using a second brightness of the display that is dimmer than the first brightness of the display.

Yet further aspects of the disclosure can be characterized as a user equipment comprising a display, a video interface, a rendering monitor, and a brightness controller. The display can display content of the user equipment. The video interface can render the content to the display and can control a brightness of the display. The rendering monitor can identify a first marker. The brightness controller can receive indication of the first marker from the rendering monitor and instruct the video interface to decrease the brightness of the display in response to receiving indication of the first marker.

BRIEF DESCRIPTION OF THE DRAWINGS

FIG. 6 shows a diagrammatic representation of one embodiment of a machine in the exemplary form of a computer system within which a set of instructions can execute for

DETAILED DESCRIPTION

The word "exemplary" is used herein to mean "serving as an example, instance, or illustration." Any embodiment described herein as "exemplary" is not necessarily to be construed as preferred or advantageous over other embodiments.

Systems and methods are herein disclosed for conserving user equipment (e.g., a wireless mobile device) battery power by dimming the device display during periods when user interest in the display is likely to be low and when there is little or no content (e.g., text, images, charts) visible on the display. For instance, in the first few seconds after a URL request in a web browser, there is little if anything rendered on the device display, and thus the display can be dimmed to save power during this time without degrading the user experience. In another instance, dimming may be useful during scrolling of a webpage or MICROSOFT WORD document where the scroll speed is faster than what a typical human can resolve.

Figure 1:
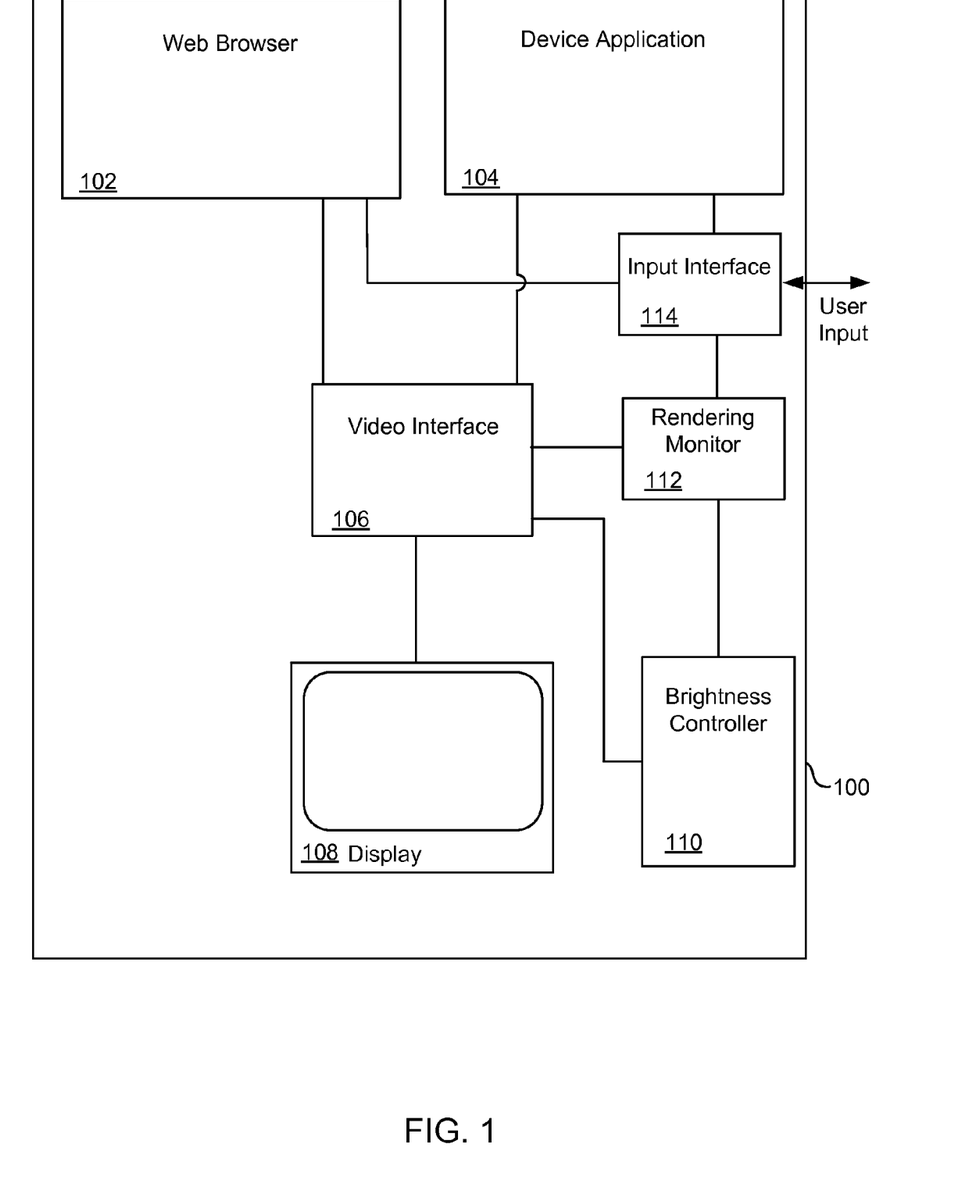
FIG. 1 illustrates a mobile device according to one embodiment of this disclosure.

FIG. 1 illustrates a mobile device according to one embodiment of this disclosure. The user equipment 100 includes a display 108 having a first, second, and third brightness states. These can also be referred to as high, low, and medium brightness states. The high brightness state is the brightest of these three states and consumes the most power while the low brightness state is the dimmest and consumes the least power. The high brightness state is brighter than the medium and low brightness states, but may or may not be the brightest state that the display 108 is capable of. For instance, the brightest state can be a default brightness or a user-defined brightness that are dimmer than a brightest state of the display. The user equipment 100 includes at least a web browser 102 and/or a device application 104, which can both send image information to a video interface 106 for rendering to the display 108. In particular, the video interface 106 converts the image information to a display signal which drives the display 108.

At the same time, a brightness controller 110 instructs the video interface 106 as to how bright or dim to render images to the display 108. A rendering monitor 112 can monitor the image information or the display signal or both, as well as user inputs to an input interface 114 (e.g., keyboard controller or touch screen controller). The rendering monitor 112 passes information describing the display 108 brightness as well as user inputs from the input interface 114 and/or identification(s) of markers to the brightness controller 110. Based on these inputs, the brightness controller 110 instructs the video interface 106 as to how, when, and what parts of the display 108 to dim, and in this way indirectly controls the brightness of the display 108. In particular, the brightness controller 110, based on information from the rendering monitor 112 describing the current brightness state, inputs from the user interface 114, and/or identified markers, instructs the video interface 106 to change the display 108 brightness. Although this disclosure focuses on an embodiment where three brightness states are used, in other embodiments, more or less than three brightness states may be implemented.

The device application 104 can include any application running on the user equipment 100 other than the web browser 102 (e.g., games, productivity software, podcasts, e-mail clients, etc.). Image information can include data or computer instructions used to render content to the display 108, where the content can be sourced from the web browser 102 or the device application 104.

The user equipment 100 can operate a power saving algorithm, attempting to operate the display 108 in the medium or low brightness states when user interest in the display 108 is likely to be low. For instance, when the user is likely to, or is exhibiting, little interest in the display 108, the brightness can be dimmed to conserve power. User interest can be inferred via various methods such as user actions or states of the web browser 102 and/or the device application 104. For instance, when rendering content, the display 108 may be partially or wholly blank or include an incomplete rendering of content. During rendering, it can be inferred that user interest is diminished, and thus this period might be a good one for dimming the display. As an example of inferring user interest based on user action, user eye movement can be monitored. Where a user's eyes are directed at the display 108, greater user interest can be inferred. Similarly, if the user's eyes are darting back and forth, as is common during reading, user interest can also be inferred. Where a user's eyes are directed away from the display 108, diminished user interest can be inferred, and such periods may be good candidates for display 108 brightness dimming. User interest can also be inferred via user interaction with a mouse or touch screen controls. These are just a few of the many ways that user interest can be inferred, and should not be considered an exhaustive or limiting list of examples.

Figure 2:
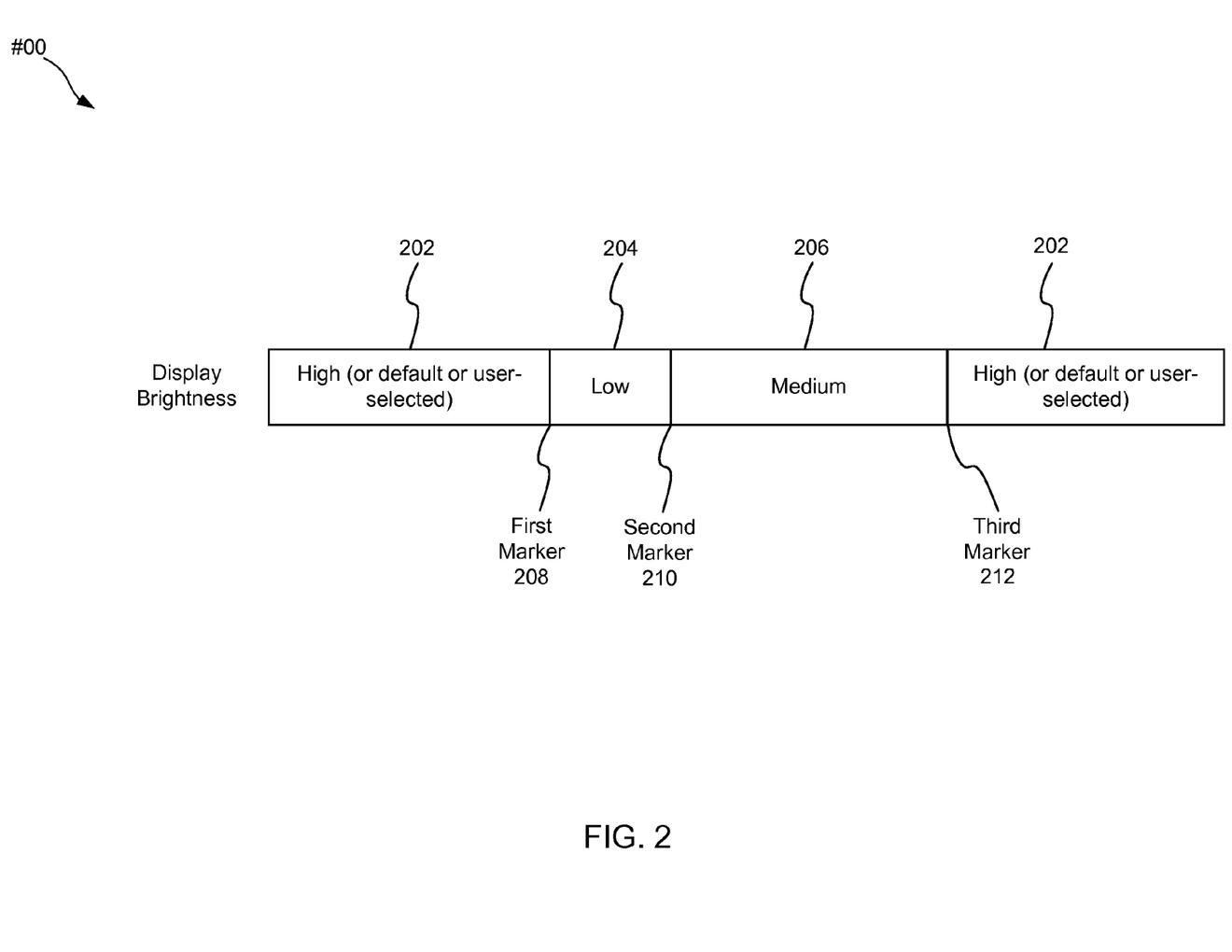
FIG. 2 illustrates a timeline of one embodiment of the display brightness.

In one embodiment, the display 108 brightness changes upon the identification of at least one of three markers (e.g., first, second, or third markers), where a marker is an event such as a URL request. FIG. 2 illustrates a timeline of one embodiment of the display brightness and the three markers. Typically the display brightness is in a first or high brightness state 202 (or a default or user-selected state). In some embodiments, the high brightness state 202 can be replaced by brightness states controlled by traditional display brightness control algorithms (e.g., where the brightness dims when the user equipment has not been used for a period of time). Upon identifying a first marker 208 (e.g., a URL request or a device application state) the brightness is lowered to a second or low brightness state 204. Upon identification of a second marker 210 (e.g., 60% of the pixels of a webpage have rendered or 70% of an audio file has been buffered) the brightness is raised to a third or medium brightness state 206. After a third marker 212 is identified (e.g., page load completion or rendering of a final pixel at the start of an application) the brightness returns to the high brightness state 202.

In some embodiments where the time between the second marker 210 and the third marker 212 is sufficiently short, the third marker 212 and the medium brightness state 206 can be foregone such that the brightness state merely jumps from the low brightness state 204 to the high brightness state 202 upon identification of the second marker 210.

The timing illustrated in FIG. 2 is exemplary only and is not drawn to scale. Also, the high brightness state 202 can include a default brightness or user-selected brightness. For instance, the default brightness may be a maximum brightness of the display or may be a brightness that changes depending on battery charge according to traditional display brightness control algorithms. Alternatively, the user may select the default brightness.

Reference to FIGS. 1 and 2 in combination will now be made. The first marker 208 can include one of the following user requests: a user request for web content via a web browser 102 (e.g., a URL request), a user request for initiation of the device application 104 (e.g., initiation of a game), a user request for content to run within the web browser 102 (e.g., start of a YOUTUBE video), a user request for content to run within the device application 104 (e.g., start of a WINDOWS MEDIA PLAYER movie once the MEDIA PLAYER is already running or resumption of video playback after a pause). For instance, where the first marker 208 is a user request for initiation of a device application 104, such as a game, there is typically a few seconds where the device application 104 loads before it is usable. During this period, the display 108 can be dimmed without detriment to the user experience. Similarly, the initiation of videos, songs, slideshows, or other media are sometimes associated with lags before the content begins to be visible or audible, and thus these initiations can constitute the first marker 208 followed by a period of dimming until the media begins to be visible or audible.

The request can be made via the input interface 114, where the input interface 114 includes inputs such as those from a touch screen, keyboard, touchpad, mouse, or buttons of a user equipment 100, to name a few non-limiting examples. When this first marker 208 is identified by the rendering monitor 112, the rendering monitor 112 passes this identification to the brightness controller 110, which can then instruct the video interface 106 to lower the brightness of the display 108 from the high brightness state 202 to the low brightness state 204. This first marker 208 can also be referred to as a page load start or URL request or start of loading (depending on the user request).

At the same time, the first marker 208 can also be a state of the device application 104 or the web browser 102. For instance, when a device application 104 loads or streaming media buffers, the state of the device application 104 or the web browser 102 can be used as the first marker (e.g., the first marker 208 can be the web browser's 102 state of buffering a YOUTUBE video).

The second marker 210 can include events that mark some level of progression for an action that started with the first marker or a user equipment activity triggered by the first marker. For instance, the second marker 210 can include completion of a pageload, completion of content rendering in the web browser 102, or a loading of the device application 104 having reached a certain point of completion. Further examples of the second marker 210 include a threshold percentage of rendering or loading being completed. For instance, the second marker 210 can be the moment when 50% (or any predefined threshold) of web content or a webpage has been rendered on the display 108, or when 50% of a web browser-based video has buffered. Other examples include, when 50% of a device application 104 has started or when 50% of a device application-based video has been cached in the user equipment 100 memory (e.g., RAM or processor memory).

While the above examples describe thresholds, further examples of the second marker 210 can include specific events. For instance, when a first pixel renders on the display 108, when all images have been rendered, or a slowing of a user scrolling a news article, to name a few examples. The second marker 210 could also be the moment when all text, but not images or dynamic content, have been rendered to the display 108.

In some embodiments, the second marker 210 can be tailored for different websites, applications, or content types. For instance, the second marker 210 for one website may be the rendering of a first pixel on the display 108, while for another website it may be the point at which 50% of the pixels for a webpage have rendered on the display 108. As another example, the second marker 210 for one application may be the point at which 40% of the application has started to run, while for another application the second marker 210 is the point at which 45% of the application has started to run.

While the second marker 210 has been described in terms of a 50% threshold in a number of examples, one of skill in the art will recognize that other threshold percentages (e.g., 52%) are also envisioned and that the threshold need not be defined as a percentage. For instance, given a certain display 108 resolution, the second marker 210 can be defined as a number of pixels having been rendered. Also, while examples have described the second marker 210 as occurring when "all" images or "all" text have rendered, one of skill in the art will recognize that the second marker 210 can also occur when less than "all" of an object has rendered to the display 108.

The third marker 212 can include events marking the completion of user actions or user equipment activities that started with or were triggered by the first marker 208. For instance, the third marker 212 can be a page load completion, the end of a device application 104 loading, the completion of content rendering within the web browser 102, or the completion of content rendering within the device application 104. For instance, the rendering monitor 112 can identify a page load completion of the web browser 102 as the third marker or it can identify the rendering of a final pixel of a device application 104 start screen as the third marker 212 as two examples. When the third marker 212 is identified by the rendering monitor 112, the rendering monitor 112 can pass this identification to the brightness controller 110, which can then instruct the video interface 106 to raise the display 108 brightness from the medium brightness state 206 to the high brightness state 202.

In some circumstances, a time between the second marker 210 and third marker 212 can be so short as to make it desirable to skip the medium brightness state 206 and move straight from the low brightness state 204 to the high brightness state 202. For instance, when a GOOGLE search loads, the time between a rendering of the first pixel (a second marker 210 that can be used in an embodiment) and completion of the page load is negligible and thus there would be little power savings from using the medium brightness state 206 rather than jumping straight from the low brightness state 204 to the high brightness state 202.

In some instances, the third marker 212 can occur before the second marker 210, which also results in the brightness state jumping from the low state 204 to the high state 202. For instance, a user may press a power button while a webpage is downloading and before the second marker 210 (e.g., 50% download), thus causing the low brightness state 204 to change to the high brightness state.

In some embodiments, the power saving algorithm described above may only operate when a user authorizes, enables, or selects the power saving algorithm. When the power saving algorithm is not authorized, enabled, or selected, the display 108 may remain in the high brightness state 202 or may have a brightness governed by a default or traditional power saving algorithm.

In some cases, a sound as recorded by a microphone of the user equipment 100 or an image or video as recorded by a camera of the user equipment 100 can indicate user interest in the display 108 and thus trigger traditional display brightness control algorithms. For instance, voice recognition might recognize a user say to a third party "I'm going to make a call now," and then turn the display brightness over to traditional display brightness control algorithms. As another example, the video camera and face recognition software could work together to monitor a user's eye movements and stop the power saving algorithm when the user's eyes are directed to the display 108, or are directed to the display 108 for a threshold period of time (e.g., 1 or 2 seconds).

Similarly, any of the three markers can represent user activities. For instance, the first 208 marker can be associated with eye movement or head movement of the user. More specifically, even after the web browser 102 has completed rendering a webpage or a device application 104 has started, movement of the user's eyes away from the display 108 may indicate a temporary lack of user interest, and this can be the first marker 208. The brightness control 110 can instruct the video interface 106 to lower the brightness of the display 108 until the user indicates renewed interest in the display, for instance by returning his/her eyes to the display 108 or by pressing a user equipment 100 button or tapping the display 108, to name a few examples. In another example, the first marker 208 can be video recognition of a user head movement; when the user's head appears to turn away from the display 108, the brightness can be lowered to the low brightness state 204.

The discussion will now shift to a more detailed description of some of the modules, components, and features illustrated in FIG. 1. In some embodiments, the brightness controller 110 can instruct the video interface 106 to dim different regions of the display 108 to different extents, or to dim one or more regions while not dimming others. In other words, the power saving methods herein discussed can be applied to different regions of the display 108 or applied differently to different regions of the display 108. For instance, if a user is watching a video and the video frame does not fill the entire display 108, then those portions of the display 108 outside of the video frame can be dimmed according to the power saving methods described above. In another example, some webpages, such as the GOGGLE and BAIDU homepages, tend to have large expanses of white space. This white space heavily taxes battery life, yet provides little information to the user. Thus, the white space could be dimmed according to the power saving methods herein described while the text and images could be left at the high brightness state 202 or at higher brightness than the dimmed level.

In one alternative, brightness can be controlled based on the content being rendered to the display 108. For instance, applications that render primarily text (e.g., text messaging applications, word processing applications, or a web browser displaying a text-centric blog post) can be rendered dimmer than applications that display media (e.g., games, video and image viewers, or a web browser displaying an online storefront with numerous pictures and animations). In other words, brightness can be dimmed where applications do not require high contrast or bright colors, or where users are less interested in high contrast or bright colors.

It should also be noted that the high brightness state 202 (or default or user-selected state) does not have to be the brightest state that the display 108 can output. Rather, the brightest state that the display 108 can output is one possible definition of the high brightness state 202, but the high brightness state 202 can also be one in which the display 108 is merely brighter than the medium and low brightness states 206, 204 or a state in which traditional display brightness control algorithms for controlling display 108 brightness take over.

The input interface 114, rendering monitor 112, brightness controller 110, and video interface 106 can each be implemented as hardware, software, firmware, or a combination of these.

Figure 3:
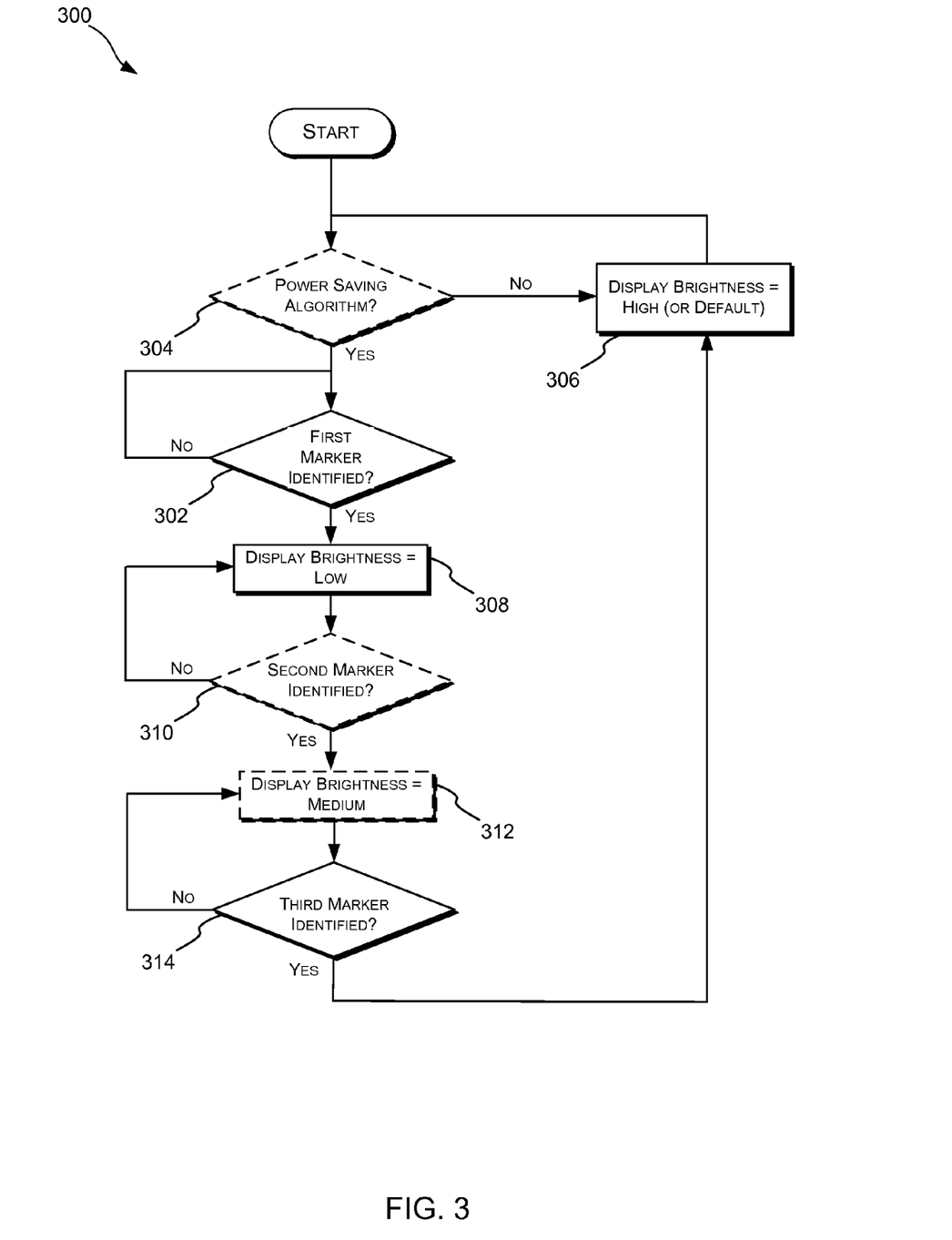
FIG. 3 illustrates an embodiment of a method for conserving user equipment power where applications are sandboxed and thus prevented from directly communicating with each other.

FIG. 3 illustrates an embodiment of a method for conserving user equipment power where applications are sandboxed and thus prevented from directly communicating with each other. A power saving algorithm can optionally be monitored for in operation 304. If a user (or an automated decision of the user equipment) has enabled the power saving algorithm, then the method 300 can monitor for a first marker and decide if the first marker has been identified in decision 302. If not, then the display continues to operate at a high brightness state or, alternatively, continues to operate via traditional display brightness control algorithms for controlling display brightness. When a first marker is identified via decision 302 the display brightness state can be set to low 308. Optionally, the method 300 can then monitor for a second marker and decided if the second marker has been identified in optional decision 310. The brightness will remain at the low state until, optionally, the second marker is identified, which, optionally, triggers the display brightness to increase to the medium state via operation 312. The display brightness remains at the medium brightness state until a third marker is identified, as determined by decision 314. The display brightness state can then be increased to high, or traditional display brightness control algorithms can take over in operation 306. The brightness remains at the high brightness state or under control of traditional display brightness control algorithms until another first marker is identified in operation 302. In an optional embodiment, the first marker may not be monitored for until a power saving algorithm is identified via decision 304.

As indicated by dashed lines, the second marker identification decision 310 and the display brightness=medium operation 312 are optional and can be foregone where a time between the second and third markers is too small to justify transitioning to the medium brightness state. The decision 304 as to whether to activate the power saving algorithm is also optional, and thus in some instances operation 306 can transition straight into operation 302 without the power saving algorithm decision 304. In other cases, the power saving algorithm decision 304 can be made during a first cycle of the illustrated method, but once the method 300 reaches the display brightness=high (or default) operation 306, the power saving algorithm decision 304 may not operate on subsequent cycles of the method 300.

Figure 4:
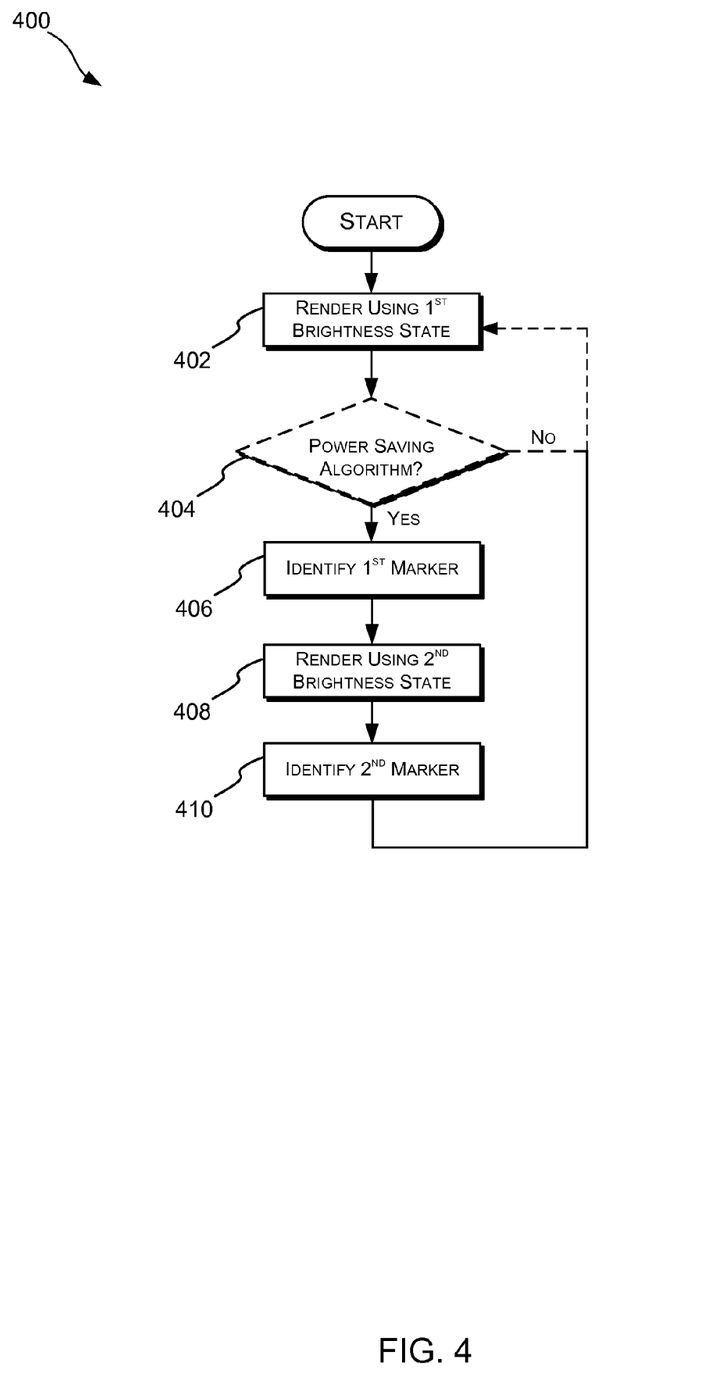
FIG. 4 illustrates another embodiment of a method for conserving user equipment power where applications are sandboxed and thus prevented from directly communicating with each other.

FIG. 4 illustrates another embodiment of a method for conserving user equipment power where applications are sandboxed and thus prevented from directly communicating with each other. The method 400 can begin by rendering content to a display of a user equipment using a first brightness state of the display via operation 402. The method 400 can then monitor user inputs and identify a first marker via operation 406, where the first marker can be a user action directed to the user equipment via operation 406 (e.g., a user request for download of a webpage). In an alternative, the first marker can be a state of an application operating on the user equipment or an automated instruction from the user equipment. Identification of the first marker can trigger a second rendering operation 408, which renders the content to the display of the user equipment using a second brightness state of the display that is dimmer than the first brightness state of the display. The method 400 can then monitor the user action that started with the first marker or can monitor a user equipment activity that was triggered by the first marker, and identify a second marker in operation 410. The second marker can be a completion of the user action or the user equipment activity. Identification of the second marker can trigger rendering of the content to the display of the user equipment using the first brightness state, operation 402.

The method 400 can be referred to as a power saving algorithm, and in some embodiments, may only take over for traditional display brightness control algorithms, where the power saving algorithm is selected. The method 400 can therefore include an optional power saving algorithm decision 404 which determines whether the power saving algorithm (or subsequent operations of the method 400) should be carried out. For instance, after the first rendering operation 402, the power saving algorithm decision 404 can determine that the power saving algorithm is not desired and can therefore enable the display brightness to remain at the first brightness state (returning to the first rendering operation 402). Alternatively, the power saving algorithm decision 404 may determine that the power saving algorithm has been activated, and then direct the method 400 to the first identification operation 406.

Display brightness as taught in the art is typically dimmed or minimized in response to a period where there is little or no user input. In contrast, here the display is dimmed when a user takes certain actions (also known as a first marker). For instance, making a request for a webpage can be the first action since it can be expected that user interest in the display will wane for a few moments while the webpage is downloaded—an opportune moment to dim the display. As another example, a user's action to scroll the display can be the first action since text and images are difficult to see during scrolling—another opportune period in which to dim the display.

Because of the unique types of user actions that can constitute the first marker, the second marker typically is a completion of a user equipment activity that was triggered by the first marker. For instance, where the first marker was a user request for download of a webpage, the second marker can be the completion of that download—a desirable moment for the display brightness to return to the first brightness state. As another example, where the first marker was a user action to scroll the display, the second marker can be the completion of scrolling. The completion of scrolling can be marked by an end to the user moving a finger across a touch screen, or an end of momentum scrolling (where the screen continues to scroll for a period of time after the user has ceased to instruct the screen to scroll). Again, this end to scrolling means that the display is again readable and thus this is an opportune moment to brighten the display.

The power saving algorithm may be selected either by a user input or by an algorithm that seeks to predict a user's desire for the power saving algorithm. In an alternative embodiment, the power saving algorithm can be selected by the user equipment automatically when the user equipment remaining battery life falls below a threshold.

In some embodiments, the first brightness state of the display, can be a default brightness state of the display or can be a brightness state of the display varied according to traditional display brightness control algorithms. In some embodiments, the default brightness state of the display can be selected by a user such that any time the default brightness state is used, it defaults to a user-selected brightness.

The content can include images, text, videos, shapes, lines, borders, and animations, to name a few non-limiting examples.

Figure 5:
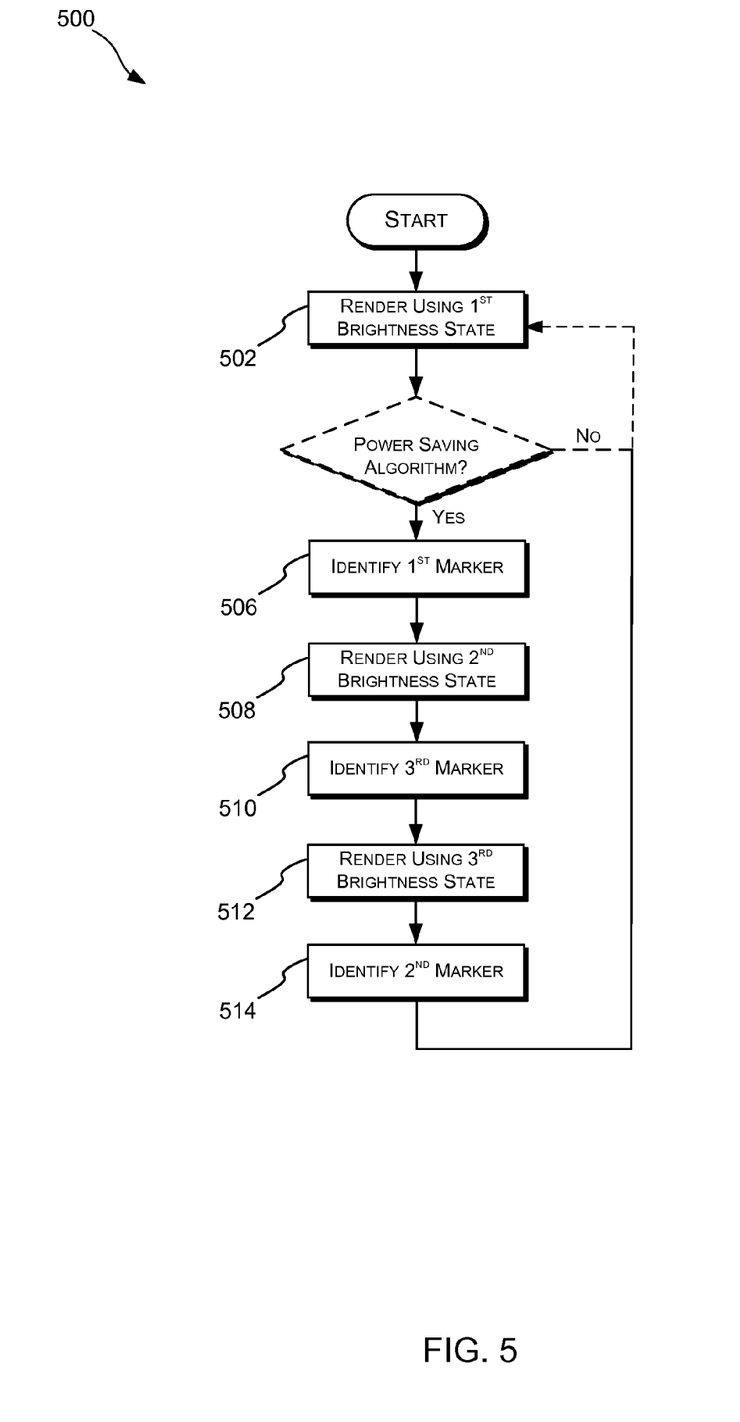
FIG. 5 illustrates yet another embodiment of a method for conserving user equipment power where applications are sandboxed and thus prevented from directly communicating with each other.

FIG. 5 illustrates yet another method for controlling a brightness state of a display of a user equipment. The method 500 begins just like the method 400, except that after the first marker is identified in operation 506 and the content is rendered via the second brightness state in operation 508, the method 500 monitors for and identifies a third marker in operation 510. The third marker can be a level of progression of the activity of the user equipment triggered by the user action (the first marker). Identification of the third marker can trigger rendering the content to the display of the user equipment using a third brightness state of the display in operation 512. The third brightness state of the display is brighter than the second brightness state of the display but dimmer than the first brightness state of the display. The method 500 then monitors for and identifies the second marker in operation 514, where the second marker is a completion of the user equipment activity. This triggers a return to the first brightness state in operation 502.

The third marker is a level of progression of the user equipment activity, the activity having been triggered by the first marker. For instance, the third marker can be a level of webpage download to the user equipment (e.g., 75% downloaded). In some cases, the third marker is an event or action that implied that a user's attention may be returning to the display, but is not as surely returning to the display as if the second marker had been identified.

Figure 6:
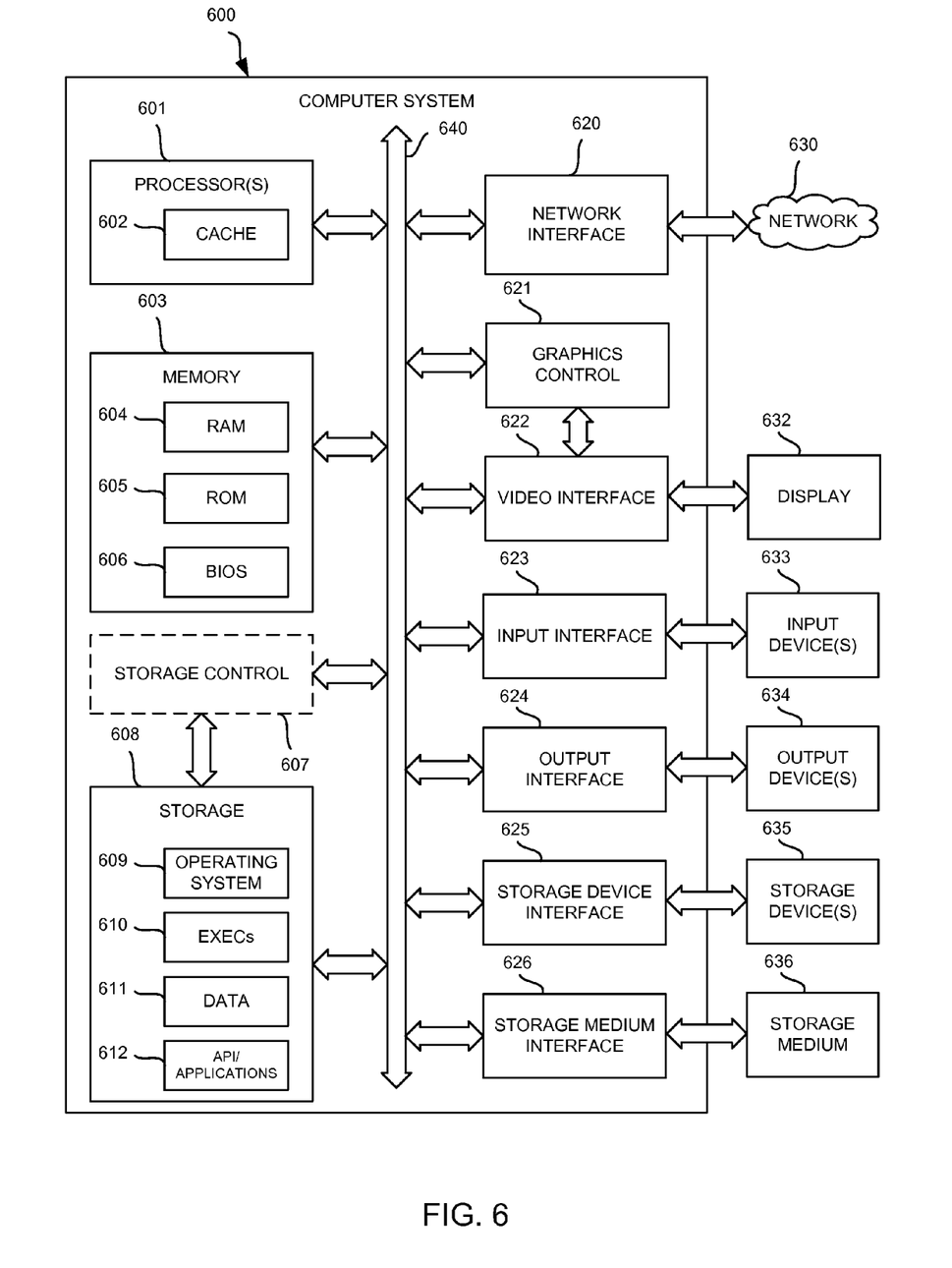

The systems and methods described herein can be implemented in a machine such as a computer system in addition to the specific physical devices described herein. FIG. 6 shows a diagrammatic representation of one embodiment of a machine in the exemplary form of a computer system 600 within which a set of instructions can execute for causing a device to perform or execute any one or more of the aspects and/or methodologies of the present disclosure. The components in FIG. 6 are examples only and do not limit the scope of use or functionality of any hardware, software, embedded logic component, or a combination of two or more such components implementing particular embodiments.

Computer system 600 may include a processor 601, a memory 603, and a storage 608 that communicate with each other, and with other components, via a bus 640. The bus 640 may also link a display 632, one or more input devices 633 (which may, for example, include a keypad, a keyboard, a mouse, a stylus, etc.), one or more output devices 634, one or more storage devices 635, and various tangible storage media 636. All of these elements may interface directly or via one or more interfaces or adaptors to the bus 640. For instance, the various tangible storage media 636 can interface with the bus 640 via storage medium interface 626. Computer system 600 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 601 (or central processing unit(s) (CPU(s))) optionally contains a cache memory unit 602 for temporary local storage of instructions, data, or computer addresses. Processor(s) 601 are configured to assist in execution of computer readable instructions. Computer system 600 may provide functionality as a result of the processor(s) 601 executing software embodied in one or more tangible computer-readable storage media, such as memory 603, storage 608, storage devices 635, and/or storage medium 636. The computer-readable media may store software that implements particular embodiments, and processor(s) 601 may execute the software. Memory 603 may read the software from one or more other computer-readable media (such as mass storage device(s) 635, 636) or from one or more other sources through a suitable interface, such as network interface 620. The software may cause processor(s) 601 to carry out one or more processes or one or more steps of one or more processes described or illustrated herein. Carrying out such processes or steps may include defining data structures stored in memory 603 and modifying the data structures as directed by the software.

The memory 603 may include various components (e.g., machine readable media) including, but not limited to, a random access memory component (e.g., RAM 604) (e.g., a static RAM "SRAM", a dynamic RAM "DRAM", etc.), a read-only component (e.g., ROM 605), and any combinations thereof. ROM 605 may act to communicate data and instructions unidirectionally to processor(s) 601, and RAM 604 may act to communicate data and instructions bidirectionally with processor(s) 601. ROM 605 and RAM 604 may include any suitable tangible computer-readable media described below.

In one example, a basic input/output system 606 (BIOS), including basic routines that help to transfer information between elements within computer system 600, such as during start-up, may be stored in the memory 603.

Fixed storage 608 is connected bidirectionally to processor(s) 601, optionally through storage control unit 607. Fixed storage 608 provides additional data storage capacity and may also include any suitable tangible computer-readable media described herein. Storage 608 may be used to store operating system 609, EXECs 610 (executables), data 611, APV applications 612 (application programs), and the like. Often, although not always, storage 608 is a secondary storage medium (such as a hard disk) that is slower than primary storage (e.g., memory 603). Storage 608 can also include an optical disk drive, a solid-state memory device (e.g., flash-based systems), or a combination of any of the above. Information in storage 608 may, in appropriate cases, be incorporated as virtual memory in memory 603.

In one example, storage device(s) 635 may be removably interfaced with computer system 600 (e.g., via an external port connector (not shown)) via a storage device interface 625. Particularly, storage device(s) 635 and an associated machine-readable medium may provide nonvolatile and/or volatile storage of machine-readable instructions, data structures, program modules, and/or other data for the computer system 600. In one example, software may reside, completely or partially, within a machine-readable medium on storage device(s) 635. In another example, software may reside, completely or partially, within processor(s) 601.

Bus 640 connects a wide variety of subsystems. Herein, reference to a bus may encompass one or more digital signal lines serving a common function, where appropriate. Bus 640 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 600 may also include an input device 633. In one example, a user of computer system 600 may enter commands and/or other information into computer system 600 via input device(s) 633. Examples of an input device(s) 633 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 633 may be interfaced to bus 640 via any of a variety of input interfaces 623 (e.g., input interface 623) including, but not limited to, serial, parallel, game port, USB, FIREWIRE, THUNDERBOLT, or any combination of the above.

In particular embodiments, when computer system 600 is connected to network 630, computer system 600 may communicate with other devices, specifically mobile devices and enterprise systems, connected to network 630. Communications to and from computer system 600 may be sent through network interface 620. For example, network interface 620 may receive incoming communications (such as requests or responses from other devices) in the form of one or more packets (such as Internet Protocol (IP) packets) from network 630, and computer system 600 may store the incoming communications in memory 603 for processing. Computer system 600 may similarly store outgoing communications (such as requests or responses to other devices) in the form of one or more packets in memory 603 and communicated to network 630 from network interface 620. Processor(s) 601 may access these communication packets stored in memory 603 for processing.

Examples of the network interface 620 include, but are not limited to, a network interface card, a modem, and any combination thereof. Examples of a network 630 or network segment 630 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 630, may employ a wired and/or a wireless mode of communication. In general, any network topology may be used.

Information and data can be displayed through a display 632. Examples of a display 632 include, but are not limited to, a liquid crystal display (LCD), an organic liquid crystal display (OLED), a cathode ray tube (CRT), a plasma display, and any combinations thereof. The display 632 can interface to the processor(s) 601, memory 603, and fixed storage 608, as well as other devices, such as input device(s) 633, via the bus 640. The display 632 is linked to the bus 640 via a video interface 622, and transport of data between the display 632 and the bus 640 can be controlled via the graphics control 621.

In addition to a display 632, computer system 600 may include one or more other peripheral output devices 634 including, but not limited to, an audio speaker, a printer, and any combinations thereof. Such peripheral output devices may be connected to the bus 640 via an output interface 624. Examples of an output interface 624 include, but are not limited to, a serial port, a parallel connection, a USB port, a FIREWIRE port, a THUNDERBOLT port, and any combinations thereof.

In addition or as an alternative, computer system 600 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of operating a user equipment comprising:
   operating a display brightness for an entire display of the user equipment at a high or default brightness;
   monitoring for a first marker indicating a start of scrolling of content on the display, scrolling being associated with lower user interest in the display than when scrolling is not occurring;
   setting a uniform display brightness of the entire display of the user equipment to a low, but not a minimum brightness, when the first marker is identified;
   monitoring for a second marker indicating a completion of the scrolling, the completion of scrolling being associated with greater user interest in the display than when scrolling is occurring; and
   setting the uniform display brightness of the user equipment to high or default brightness when the second marker is identified.

2. The method of claim 1, further comprising monitoring for a third marker indicating a progression of the scrolling, and setting the entire display brightness to a brightness between high and low when the third marker is identified.

3. The method of claim 1, further comprising an additional power-saving display dimming operation comprising the high or default brightness as well as one or more additional dimmer brightness settings, the additional power-saving dimming operation triggered when a period of inactivity of the user equipment occurs.

4. The method of claim 1, wherein the high or default brightness changes depending on battery charge.

5. The method of claim 1, further comprising turning control of the display brightness over to a traditional display brightness control algorithm when the user equipment recognizes certain audible phrases or recognizes that eye movement remains directed at the display for a threshold period of time.

6. The method of claim 1, further comprising dimming all portions of the display outside of a video frame of interest to the user.

7. The method of claim 1, further comprising:
   identifying white space on a website; and
   decreasing a uniform display brightness of the white space while the user equipment remains on a given webpage.

8. The method of claim 1, wherein the first marker is a user action to scroll the display, and the second marker is an end to the user moving a finger across the display or an end of momentum scrolling.

9. A non-transitory, tangible computer readable storage medium, encoded with processor readable instructions to perform a method for controlling a brightness of a display of a user equipment, the method comprising:
   rendering content to a display of a user equipment using a first uniform brightness of the overall display;
   identifying a first marker indicative of a start of scrolling of content on the display;
   rendering the content to the display of the user equipment using a second uniform brightness of the overall display that is dimmer than the first uniform brightness of the overall display; and
   identifying a second marker indicative of a completion of the scrolling; and
   rendering the content to the display of the user equipment using the second brightness of the overall display.

10. The non-transitory, tangible computer readable storage medium of claim 9, further comprising:
    identifying a third marker indicative of a progression of the scrolling; and
    rendering the content to the display of the user equipment using a third brightness of the overall display that is brighter than the second brightness of the overall display but dimmer than the first brightness of the overall display.

11. The non-transitory, tangible computer readable storage medium of claim 10, wherein the first brightness of the overall display is a default brightness of the display.

12. The non-transitory, tangible computer readable storage medium of claim 9, wherein the content includes one or more features selected from the group consisting of: images, text, videos, shapes, lines, borders, and animations.

13. A user equipment comprising:
    a display for displaying content of the user equipment;
    a video interface that renders the content to the display and controls a uniform brightness of the overall display;

a rendering monitor that identifies a user request for a URL as well as a page load completion of a webpage accessible at the URL; and a brightness controller receiving an indication of the user request for the URL from the rendering monitor and instructing the video interface to decrease the uniform brightness of the overall display to a first uniform brightness in response to receiving the indication of the user request for the URL, and instructing the video interface to increase the uniform brightness of the overall display to a second uniform brightness in response to receiving the indication of the completion of the page load from the rendering monitor.

14. The user equipment of claim 13, wherein the rendering monitor further identifies a moment when all text, but no images or dynamic content have been rendered to the display, and wherein the brightness controller further instructs the video interface to increase the uniform brightness of the overall display to a third uniform brightness of the overall display in response to receiving indication from the rendering monitor that all text, but no images or dynamic content have been rendered to the display, the third uniform brightness being brighter than the first uniform brightness but dimmer than the second uniform brightness.

15. The user equipment of claim 13, wherein the rendering monitor further identifies a state of rendering of web content accessed from the requested URL, and wherein the brightness controller further instructs the video interface to increase the uniform brightness of the overall display to a third uniform display brightness in response to receiving indication from the rendering monitor that the state of rendering of web content is a given state other than a completed state and other than a completely non-rendered state, wherein the third uniform display brightness is brighter than the first uniform display brightness but dimmer than the second uniform display brightness.

16. The user equipment of claim 15, wherein the state that triggers the third uniform display brightness is different for at least two different URLs.

17. The user equipment of claim 16, wherein the state is a number of pixels that have been rendered.

18. The user equipment of claim 13, wherein the uniform brightness of the overall display in response to receiving indication of the user request for the URL, depends on whether a corresponding webpage displays primarily text or media, where media includes animations, videos, games, and images.

19. A non-transitory, tangible computer readable storage medium, encoded with processor readable instructions to perform a method for controlling a brightness of a display of a user equipment, the method comprising:

rendering first content to a display of a user equipment using a first uniform brightness of the overall display;

identifying a first marker indicative of a user request for a URL;

downloading second content from the URL to the display of the user equipment using a second uniform brightness of the overall display that is dimmer than the first uniform brightness of the overall display;

identifying a second marker indicative of a completion of the downloading; and rendering the second content to the display of the user equipment using the second brightness of the overall display.

* * * * *